United States Patent
Hirose et al.

(10) Patent No.: US 10,497,499 B2
(45) Date of Patent: Dec. 3, 2019

(54) OXIDE CERAMIC AND CERAMIC ELECTRONIC COMPONENT

(71) Applicant: Murata Manufacturing Co., Ltd., Nagaokakyo-shi, Kyoto-fu (JP)

(72) Inventors: Sakyo Hirose, Nagaokakyo (JP); Tsuyoshi Kimura, Suita (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 642 days.

(21) Appl. No.: 15/355,400

(22) Filed: Nov. 18, 2016

(65) Prior Publication Data

US 2017/0069413 A1    Mar. 9, 2017

Related U.S. Application Data

(63) Continuation of application No. PCT/JP2015/057871, filed on Mar. 17, 2015.

(30) Foreign Application Priority Data

May 21, 2014    (JP) ................................ 2014-105339

(51) Int. Cl.
    *H01F 1/34*      (2006.01)
    *C04B 35/26*      (2006.01)
    (Continued)

(52) U.S. Cl.
CPC .......... *H01F 1/344* (2013.01); *C04B 35/2633* (2013.01); *H01F 27/24* (2013.01); *H01F 27/28* (2013.01); *H01F 27/29* (2013.01); *C04B 2235/3206* (2013.01); *C04B 2235/3213* (2013.01); *C04B 2235/3215* (2013.01); *C04B 2235/3222* (2013.01); *C04B 2235/3274* (2013.01); *C04B 2235/3275* (2013.01); *C04B 2235/96* (2013.01)

(58) Field of Classification Search
CPC .......... H01F 1/344; H01F 27/24; H01F 27/29; H01F 27/28; C04B 35/26; C04B 35/2633; C04B 35/2666; C04B 35/6265; C04B 35/634; C04B 35/638; C04B 35/2683
USPC ..................... 336/200, 232; 252/62.63, 62.58
See application file for complete search history.

(56) References Cited

U.S. PATENT DOCUMENTS 3,078,234 A *   2/1963   Davis, Jr. ............ C04B 35/2666
                                                                         252/62.56
3,638,207 A *   1/1972   Smith ................. C04B 35/2608
                                                                         252/62.57

(Continued)

FOREIGN PATENT DOCUMENTS

JP    2007-055832 A    3/2007
JP    2009-224563 a    10/2009
(Continued)

OTHER PUBLICATIONS

International Search Report issued for PCT/JP2015/057871, dated Jun. 30, 2015.

(Continued)

*Primary Examiner* — Tszfung J Chan
(74) *Attorney, Agent, or Firm* — Arent Fox LLP (57) ABSTRACT

An oxide ceramic expressed by the general formula $Sr_{2-x}Ba_xCo_{2-y}Mg_yFe_{12-z}Al_zO_{22}$, where $0.7 \leq x \leq 1.3$, $0 < y \leq 0.8$, and $0.8 \leq z \leq 1.2$.

16 Claims, 5 Drawing Sheets

(51) Int. Cl.
*H01F 27/24* (2006.01)
*H01F 27/28* (2006.01)
*H01F 27/29* (2006.01)

(56) References Cited

U.S. PATENT DOCUMENTS

| | | | | |
|---|---|---|---|---|
| 5,118,575 | A * | 6/1992 | Maekawa | G11B 5/70678 252/62.59 |
| 5,183,631 | A * | 2/1993 | Kugimiya | B22F 1/02 419/10 |
| 6,284,150 | B1 * | 9/2001 | Ogata | C01G 49/0054 252/62.51 C |
| 6,402,980 | B1 * | 6/2002 | Taguchi | C04B 35/2633 252/62.57 |
| 6,537,463 | B2 * | 3/2003 | Iwasaki | H01F 1/059 148/301 |
| 2004/0254058 | A1 * | 12/2004 | Takagi | C04B 33/1327 501/117 |
| 2006/0284136 | A1 * | 12/2006 | Takami | H01F 1/11 252/62.63 |
| 2009/0196818 | A1 | 8/2009 | Tokura et al. | |
| 2009/0218540 | A1 * | 9/2009 | Takami | C01G 49/0018 252/62.57 |
| 2009/0314981 | A1 * | 12/2009 | Yanagida | C04B 35/2633 252/62.55 |
| 2012/0229354 | A1 * | 9/2012 | Ishikura | C04B 35/2633 343/787 |
| 2015/0210597 | A1 | 7/2015 | Hirose et al. | |

FOREIGN PATENT DOCUMENTS

| | | |
|---|---|---|
| JP | 2012-001396 A | 1/2012 |
| JP | 2015-040151 A | 3/2015 |
| WO | WO 2007/135817 A1 | 11/2007 |
| WO | WO 2014/061671 A1 | 9/2016 |

OTHER PUBLICATIONS

Written Opinion of the International Searching Authority issued for PCT/JP2015/057871, dated Jun. 30, 2015

* cited by examiner

OXIDE CERAMIC AND CERAMIC ELECTRONIC COMPONENT

CROSS REFERENCE TO RELATED APPLICATIONS

The present application is a continuation of International application No. PCT/JP2015/057871, filed Mar. 17, 2015, which claims priority to Japanese Patent Application No. 2014-105339, filed May 21, 2014, the entire contents of each of which are incorporated herein by reference.

FIELD OF THE INVENTION

The present invention relates to an oxide ceramic and a ceramic electronic component, more particularly, an oxide ceramic formed from a ferromagnetic dielectric material which exhibits an electrical magnetic effect, and a ceramic electronic component such as a variable inductor, obtained with the use of the oxide ceramic.

BACKGROUND OF THE INVENTION

In recent years, ferromagnetic dielectric (Multiferroics) materials that make multiple effects in the coexistence of ferromagnetism and ferroelectricity have been attracting attention, and actively researched and developed.

The ferromagnetic dielectric materials are known to induce, when a magnetic field acts thereon, spiral magnetic ordering to produce ferroelectricity, thereby producing electric polarization, or changing the electric polarization or the dielectric constant, and exhibiting a so-called electrical magnetic effect of causing magnetization or making a change in magnetization when an electric field acts thereon.

The ferromagnetic dielectric materials can, by the electrical magnetic effect described above, produce a change in magnetization with an electric field, and a change in electric polarization with a magnetic field, and have been thus expected to be applied to various ceramic electronic components such as a variable inductor that changes in magnetic permeability or magnetization through the application of an electric field, a variable magnetization device for a writing head of a storage medium, or a magnetic sensor that detects magnetism, and further, a non-volatile memory, for example.

Further, Patent Document 1 proposes a multiferroic element configured to control the orientation of electric polarization substantially perpendicular to an external magnetic field through the application of the external magnetic field to a multiferroic solid material that has both ferroelectricity and ferromagnetism with a spin structure where the spin orientation is rotated to follow the outside of a cone (the vertex of the cone has an opening angle α in the range of 0 degrees<α≤90 degrees).

In Patent Document 1 herein, the use of $CoCr_2O_4$ (M=Mn, Fe, Co, Ni) as a ferromagnetic dielectric material (multiferroic material) produces electric polarization through the action of a magnetic field in a cryogenic range around 26 K, and achieves electric polarization of 2 μC/m² around 5 K.

In addition, Patent Document 2 proposes a multiferroic element configured to induce an electric current with a multiferroic solid material including a ferric oxide as a main raw material, which has both ferroelectricity and ferromagnetism, through a weak external magnetic field of 300 G (gauss) or less.

Patent Document 2 herein states that when a low magnetic field of 300 G (0.03 T) is allowed to act with the use of a ferrite compound of $Ba_2Mg_2Fe_{12}O_{22}$ as a ferromagnetic dielectric material (multiferroic material), an electric current flows in response to the application of an alternating magnetic field at −268° C. (5 K), and electric polarization is also produced to alternate the positive and negative.

Furthermore, Patent Document 3 proposes an electrical magnetic effect material configured to include, as a main constituent, an oxide ceramic represented by the general formula $(Sr_{1-\alpha}Ba_\alpha)_3(Co_{1-\beta}B_\beta)_2Fe_{24}O_{41+\delta}$ (in the formula, B represents one or more elements selected from the group consisting of Ni, Zn, Mn, Mg, and Cu, and α, β, and δ respectively meet 0≤α≤0.3, 0≤β≤0.3, and −1≤δ≤1), which has an electrical magnetic effect in the temperature range of 250 to 350 K and the magnetic field range of 0.05 T (tesla) or less.

In Patent Document 3 herein, a ferromagnetic dielectric material is achieved which has a region with electric polarization of 1.0 to 9.5 μC/m² around room temperature and in the magnetic field range of 0.05 T or less, and an electrical magnetic coupling coefficient of 100 ps/m or more, up to 470 ps/m, through the sweep between −0.05 T and +0.05 T with the use of the ferromagnetic dielectric material that has a hexagonal z-type crystal structure represented by the general formula.

Patent Document 1: WO 2007/135817 (claims 1, 3; paragraph number [0031], FIG. 7, etc.)
Patent Document 2: Japanese Patent Application Laid-Open No. 2009-224563 (claims 1, 3; paragraph number [0032], FIG. 7, etc.)
Patent Document 3: Japanese Patent Application Laid-Open No. 2012-1396 (claim 1; paragraph numbers [0010], [0061], Table 3, FIG. 3, etc.)

SUMMARY OF THE INVENTION

In this regard, there is a need to produce an electrical magnetic effect at room temperature, in order to apply the ferromagnetic dielectric material to various types of electronic components such as variable inductors and non-volatile memories.

However, according to Patent Documents 1 and 2 as mentioned above, the electrical magnetic effects are produced only in the low-temperature ranges significantly lower than room temperature, but unable to be produced at room temperature, and it is thus currently difficult to achieve various types of ceramic electronic components for practical use with the use of the electrical magnetic effects.

In addition, according to Patent Document 3, the use of the ferromagnetic dielectric material that has the hexagonal Z-type crystal structure achieves the electrical magnetic coupling coefficient up to 470 ps/m around room temperature, but the crystal structure is complex as is clear from the general formula mentioned above, and for this reason, it is difficult to achieve a ferromagnetic dielectric material that has a stable crystal structure without any different phase formed.

The present invention has been achieved in view of these circumstances, and an object of the invention is to provide an oxide ceramic which is easily able to exhibit a much greater electrical magnetic effect at room temperature than ever before, and a ceramic electronic component obtained with the use of the oxide ceramic.

The oxide ceramic of the ferrite compound represented by the general formula $(Sr, Ba)_2Co_2Fe_{12}O_{22}$ is able to produce and control electric polarization in a low magnetic field. Moreover, this oxide ceramic is capable of stably maintaining spiral magnetic ordering capable of developing ferroelectricity up to a relatively high temperature, and thus considered able to, with improvement, produce an electrical magnetic effect at room temperature.

Therefore, the inventors have earnestly carried out studies on the $(Sr, Ba)_2Co_2Fe_{12}O_{22}$ based compound, thereby reaching a finding that the combination ratio between Ba and Sr at the Sr site is adjusted to fall within a predetermined range, and some of Co is substituted with Mg for a predetermined combination ratio, whereas some of Fe is substituted with Al for a predetermined combination ratio, thereby making it possible to achieve, even at room temperature, a dramatically high electrical magnetic coupling coefficient that has been conventionally unable to be achieved in a near-zero magnetic field range, and making it possible to achieve an oxide ceramic of ferromagnetic dielectric that has favorable electric polarization in a low magnetic field.

The inventors have carried out further studies, thereby determining that the polarity of electric polarization is not reversed even when the polarity of a magnetic field applied is reversed in the oxide ceramic containing therein Mg as mentioned above.

Furthermore, as a result of further earnest studies carried out by the inventors, it has been determined that while the $(Sr, Ba)_2Co_2Fe_{12}O_{22}$ based compound typically has a hexagonal Y-type crystal structure, the compound even in a system of crystal that has less symmetry than the hexagonal system, with the symmetry slightly displaced from the hexagonal system, achieves a similar effect with predetermined amounts of Mg and Al in the form mentioned above, as long as the compound is a ferrite compound containing Sr, Ba, Co, and Fe in its main constituent.

The present invention has been made on the basis of the findings, and an oxide ceramic according to the present invention is formed from a ferrite compound containing at least Sr, Ba, Co, and Fe, and characterized in that some of the Sr is substituted by the Ba, and when the content of the Ba is represented by x/2 in terms of molar ratio with respect to the total amount of the Ba and the Sr, x is 0.7 to 1.3; some of the Co is substituted by Mg, and when the content of the Mg is represented by y/2 in terms of molar ratio with respect to the total amount of the Mg and the Co, y is 0.8 or less; and some of the Fe is substituted by Al, and when the content of the Al is represented by z/12 in terms of molar ratio with respect to the total amount of the Al and the Fe, z is 0.8 to 1.2.

In addition, the oxide ceramic according to the present invention is preferably expressed by the general formula $Sr_{2-x}Ba_xCo_{2-y}Mg_yFe_{12-z}Al_zO_{22}$.

In addition, in the oxide ceramic according to the present invention, the $0.4 \leq y \leq 0.8$ or more.

In addition, in the oxide ceramic according to the present invention, the polarity of electric polarization is preferably not reversed when the polarity of a magnetic field is reversed.

In addition, a ceramic electronic component according to the present invention is a ceramic electronic component with an external electrode formed on the surface of a component body, which is characterized in that the component body is formed from the oxide ceramic according to any of the foregoing.

In addition, in the ceramic electronic component according to the present invention, a coil is preferably disposed to have inductance depending on the magnetic permeability of the component body.

Thus, various types of ceramic electronic components such as magnetization switches and variable inductors can be easily obtained with the use of ferromagnetic dielectric characteristics.

In addition, in the ceramic electronic component according to the present invention, an internal electrode is preferably buried in the component body.

In addition, a ceramic electronic component according to the present invention is a ceramic electronic component with an external electrode formed on the surface of a component body, which is characterized in that the component body is formed from the oxide ceramic mentioned above.

Furthermore, in the ceramic electronic component according to the present invention, an internal electrode is also preferably buried in the component body.

With the oxide ceramic according to the present invention, a high electrical magnetic coupling coefficient can be achieved in a near-zero magnetic field range even at room temperature, and a ferromagnetic dielectric body can be achieved which has a favorable electric polarization in a low magnetic field.

Furthermore, in the oxide ceramic mentioned above, the polarity of electric polarization is not reversed even when the polarity of a magnetic field applied is reversed, and the oxide ceramic is thus able to be applied to various types of ceramic electronic components expected to produce this type of electrical magnetic effect.

In addition, the ceramic electronic component according to the present invention is a ceramic electronic component with an external electrode formed on the surface of a component body, where the component body is formed from the oxide ceramic according to any of the foregoing. Thus, a high electrical magnetic coupling coefficient can be achieved in a near-zero magnetic field range even at room temperature, with large electric polarization in a low magnetic field, and because the polarity of the electric field is not reversed even when the polarity of a magnetic field applied is reversed, various types of ceramic electronic components can be achieved, such as a variable inductor that requires this type of electrical magnetic effect to be produced.

DETAILED DESCRIPTION OF THE INVENTION

Next, an embodiment of the present invention will be described in detail.

An oxide ceramic as an embodiment of the present invention has a hexagonal Y-type crystal structure containing at least Sr, Ba, Co, and Fe.

This hexagonal Y-type crystal structure has a stacked structure where an S block of a spinel structure ($CoO \cdot Fe_2O_3$) and a T block of a hexagonal closest packing structure of (Sr, Ba) and O (oxygen atom) are stacked in the order of T-S-T-S-T-S- . . . .

Further, some of Sr is substituted by Ba, and when the content of Ba is represented by x/2 in terms of molar ratio with respect to the total amount of the Ba and the Sr, x is 0.7 to 1.3.

In addition, some of Co is substituted by Mg, and when the content of Mg is represented by y/2 in terms of molar ratio with respect to the total amount of the Mg and the Co, y is 0.8 or less.

Furthermore, some of Fe is substituted by Al, and when the content of Al is represented by z/12 in terms of molar ratio with respect to the total amount of the Fe and the Al, z is 0.8 to 1.2.

More specifically, the oxide ceramic contains, as its main constituent, a $SrBaCo_2Fe_{12}O_{22}$ based compound that has a hexagonal Y-type crystal structure, that is, a $(Sr, Ba)O_2 \cdot (CoO)_2 \cdot (Fe_2O_3)_6$ based compound, and the oxide ceramic can be represented by the following general formula (A).

$$Sr_{2-x}Ba_xCo_{2-y}Mg_yFe_{12-z}Al_zO_{22} \qquad (A)$$

Further, in the general formula (A), x, y, and z satisfy formulas (1) to (3).

$$0.7 \leq x \leq 1.3 \qquad (1)$$

$$0 < y \leq 0.8 \qquad (2)$$

$$0.8 \leq z \leq 1.2 \qquad (3)$$

As just described, the present oxide ceramic, because of the fact that the general formula (A) satisfies the formulas (1) to (3), can achieve a high electrical magnetic coupling coefficient in a near-zero magnetic field range even at room temperature, and makes it possible to achieve favorable electric polarization in a low magnetic field, thereby allowing a greater electrical magnetic effect to be produced.

Moreover, the present oxide ceramic can achieve a ferromagnetic dielectric material where the polarity of electric polarization P is not reversed even when the polarity of a magnetic field B applied is reversed.

In the ferromagnetic dielectric material that exhibits an electrical magnetic effect, when spiral magnetic ordering is produced, the electric polarization P is induced, and the magnetic ordering can be controlled by controlling the orientation of the electric polarization with an electric field. Thus, there is a close relationship between the electric polarization P and the magnetic ordering, and as indicated in the formula (4), the change in electric polarization P with respect to the change in magnetic field B is defined as an electrical magnetic coupling coefficient α, thereby making it possible to evaluate ferromagnetic dielectric characteristics with the electrical magnetic coupling coefficient α.

$$\alpha = \mu_0 (dP/dB) \qquad (4)$$

where $\mu_0$ represents a magnetic permeability in vacuum ($=4\pi \times 10^{-7}$ H/m).

On the other hand, the current density J of an electrical magnetic current can be expressed by the following formula (5).

$$J = dP/dt \qquad (5)$$

Therefore, the electric polarization P can be figured out by integrating the current density J of an electrical magnetic current with respect to time t.

In addition, the change in electric polarization P with respect to a change in magnetic field B is expressed by the following formula (6).

$$dP/dB = (dP/dt)/(dB/dt) = J/(dB/dt) \qquad (6)$$

where dB/dt represents a sweep rate of a magnetic field.

When the formula (4) is substituted into the formula (6), an electrical magnetic coupling coefficient α can be expressed by the formula (7).

$$\alpha = (\mu_0 \cdot J)/(dB/dt) \qquad (7)$$

Accordingly, the electrical magnetic coupling coefficient α can be obtained by dividing the product of magnetic permeability $\mu_0$ in vacuum and current density J by the sweep rate (dB/dt) of the magnetic field B.

As is clear from the formula (7), the electrical magnetic coupling coefficient α is higher as the current density J of an electrical magnetic current is higher. Therefore, as the change rate of the electric polarization P related to the current density J is higher from the formula (5), the electrical magnetic coupling coefficient α is higher, and a giant electrical magnetic effect can be achieved, thereby providing a ferromagnetic dielectric body. In addition, the electrical magnetic coupling coefficient α is figured out from the electric polarization P generated by the sweep of the magnetic field B, and nearly equivalent to a change in magnetization through the application of an electric field. Therefore, the change in magnetization or magnetic permeability through the application of an electric field is also larger as the electrical magnetic coupling coefficient α is higher.

Further, according to the present embodiment, the general formula (A) mentioned above satisfies the formulas (1) to (3) mentioned above, favorable electric polarization P can be thus achieved in a low magnetic field even at room temperature, and the electrical magnetic coupling coefficient α can be achieved to be high in a near-zero magnetic field range.

In addition, according to the present embodiment, the electric polarization P is induced in a specific direction in a low magnetic field, whereas the electric polarization P is extinguished or reduced in a near-zero magnetic field range, and thereafter, even when the polarity of the magnetic field B is reversed at the zero magnetic field, the polarity of the electric polarization P is not reversed. For example, even then the polarity of an applied magnetic field is reversed from positive to negative, the polarity of the electric polarization is not reversed, with the positive magnetic field maintained. In addition, the orientation of the electric polarization P is determined by voltage polarization in a magnetic field, and can be changed freely by polarization treatment in any direction.

As just described, even when the polarity of the magnetic field B is reversed, ferroelectric polarization is induced in the same direction, and a type of electrical magnetic effect can be produced without reversing the polarity of the electric polarization P.

In this regard, x is adjusted to fall within the range of 0.7 to 1.3 as indicated in the formula (1) mentioned above, because x of less than 0.7 or more than 1.3 makes it difficult to induce a spiral magnetic ordering phase at room temperature, thereby possibly resulting in an inability to generate the electric polarization P.

In addition, y is adjusted to 0.8 or less as indicated in the formula (2) mentioned above, because y in excess of 0.8 excessively reduces the molar content of Co, thereby possibly resulting in an inability to measure any electrical magnetic current at room temperature, and thus in an inability to generate any electric polarization.

Further, as long as y in the general formula (A) is 0.8 or less, the polarity of the electric polarization P can be adapted not to be reversed even when the polarity of the magnetic field B is reversed. However, y is preferably $0.4 \leq y \leq 0.8$. More specifically, the adjustment of y in this range can reliably achieve an oxide ceramic that has a favorable electrical magnetic effect at room temperature, without reversing the polarity of the electric polarization P, even when the polarity of the magnetic field B is reversed.

It is to be noted that even when the oxide ceramic contains therein no Mg, that is, y is 0, large electric polarization P can be achieved at room temperature and in a low magnetic field, but in this case, when the polarity of the magnetic field B is reversed at the zero magnetic field, the polarity of the electric polarization P is also reversed. Therefore, Mg is an essential constituent in order to achieve an oxide ceramic where the polarity of the electric polarization P is not reversed even when the polarity of the magnetic field B applied is reversed.

In addition, z is adjusted to fall within the range of 0.8 to 1.2 as indicated in the formula (3) mentioned above for the following reasons.

More specifically, z of less than 0.8 makes it difficult to induce a spiral magnetic ordering phase at room temperature, thereby possibly resulting in an inability to generate the electric polarization P.

On the other hand, z in excess of 1.2 results in exceeding the solid-solubility limit of Al, thereby making different phases other than the hexagonal Y-type crystalline phase more likely to be produced, and for this reason, the different phases interfere with the development of electrical magnetic characteristics, thereby making it difficult to achieve the electric polarization P.

It is to be noted that while the ferrite compound of the hexagonal Y-type crystal structure that has the stacking cycle of the S block and the T block has been described in detail in the embodiment mentioned above, a system of crystal may be adopted which has less symmetry of crystal than the hexagonal system, with the partially collapsed cyclic structure of the stacking cycle.

In addition, a system of crystal may be adopted which has less symmetry of crystal than the hexagonal system, with ions coordinate in predetermined atom positions of crystal lattices, slightly displaced from the predetermined atom positions.

For example, in the hexagonal Z-type crystal structure, ions such as $O^{2-}$, $Co^{2+}$, and $Mg^{2+}$ constituting crystals are arranged in predetermined atom positions defined by $P6_3/mmc$ as a space group describing the symmetry of crystal. Thus, the present invention can be also applied to such crystal structures that has less symmetry of crystal than the hexagonal system, with the ions moved from the predetermined atom positions and arranged in the atom positions defined by another space group.

More specifically, for the present oxide ceramic, it is important for a ferrite compound containing at least Sr, Ba, Co, and Fe to contain therein the predetermined amounts of Mg and Al mentioned above, and even systems of crystal which have slightly less symmetry of crystal than the hexagonal system can achieve the desired object of the present invention.

Next, a method for manufacturing the present oxide ceramic will be described in detail.

First, a Fe compound such as $Fe_2O_3$, a Sr compound such as $SrCO_3$, a Ba compound such as $BaCO_3$, a Mg compound such as MgO, a Co compound such as $Co_3O_4$, and an Al compound such as $Al_2O_3$ are prepared as ceramic raw materials.

Then, the respective ceramic raw materials are weighed such that the general formula (A) mentioned above satisfies the formulas (1) to (3) in the composition after firing.

Next, the weighed ceramic raw materials are put in a grinder such as a pot mill, along with a grinding medium such as partially stabilized zirconium (hereinafter, referred to as "PSZ") balls, a dispersant, and a solvent such as pure water, and sufficiently mixed and ground, thereby providing a mixture.

Next, the mixture is dried, granulated, and then subjected to calcination for a predetermined period of time under the air atmosphere at a temperature of 1000 to 1100° C., thereby providing a calcined product.

Then, this calcined product is granulated, then put again in a grinder along with a grinding medium, a dispersant, and an organic solvent such as ethanol and toluene, sufficiently mixed and ground, and then with the addition of a binder solution thereto, sufficiently mixed, thereby providing ceramic slurry.

It is to be noted that the binder solution is not to be considered particularly limited, but for example, an organic binder such as a polyvinyl butyral resin dissolved in an organic solvent such as ethanol and toluene can be used, to which an additive such as a plasticizer is added, if necessary.

Then, the thus formed ceramic slurry is formed into a sheet through the use of a forming process method such as a doctor blade method, and cut into a predetermined dimension, thereby providing ceramic green sheets. Then, the ceramic green sheets are stacked to reach a predetermined number of sheets, subjected to pressure bonding, and cut into a predetermined size, thereby providing a ceramic compact.

Next, this ceramic compact is subjected to binder removal treatment at 300 to 500° C. under the air atmosphere, and then subjected to firing treatment at 1150 to 1250° C. under the air atmosphere, thereby providing a ceramic sintered body.

Thereafter, heat treatment is then adequately carried out under an atmosphere at an oxygen concentration of 0.2 to 1.0 MPa, thereby preparing an oxide ceramic.

As just described, the present oxide ceramic is formed from a ferrite compound containing at least Sr, Ba, Co, and Fe, where the general formula (A) satisfies the formulas (1) to (3). Thus, even at room temperature, the electrical magnetic coupling coefficient α can be achieved to be high in a near-zero magnetic field range without requiring a magnetic bias.

In addition, an oxide ceramic can be achieved which is a ferromagnetic dielectric body that can achieve the favorable electric polarization P in a low magnetic field, and develop a giant electrical magnetic effect at room temperature without reversing the electric polarization P even when the polarity of a magnetic field applied is reversed.

Next, a ceramic electronic component obtained with the use of the present oxide ceramic will be described in detail.

Figure 1:
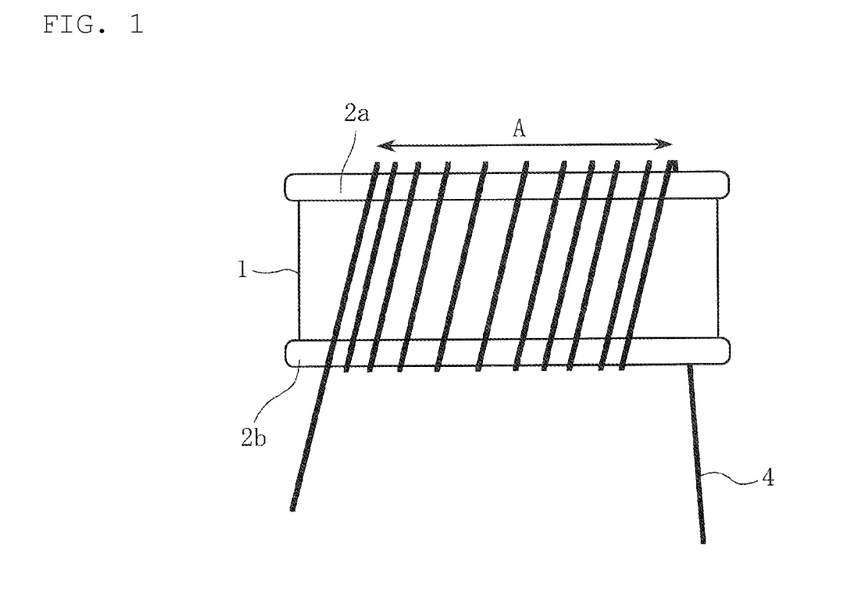
FIG. 1 is a front view illustrating an embodiment of a ceramic electronic component formed with the use of an oxide ceramic according to the present invention.
Figure 2:
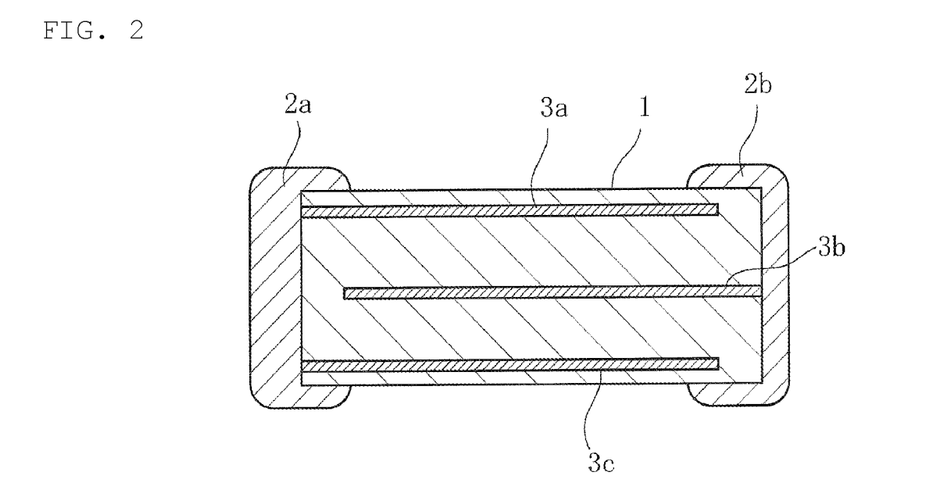
FIG. 2 is a cross-sectional view of FIG. 1.

FIG. 1 is a front view illustrating an embodiment of a variable inductor as a ceramic electronic component according to the present invention, and FIG. 2 is a cross-sectional view thereof.

This variable inductor has a component body 1 formed from the oxide ceramic mentioned above, and external electrodes 2a, 2b formed on both ends of the component body 1.

In addition, this variable inductor is provided with a coil such that a magnetic flux passes through the component body 1 when a high-frequency signal flows. Specifically, according to this embodiment, a coil 4 formed from a conductive material such as Cu is wound so as to surround the external electrode 2a and the external electrode 2b.

Furthermore, the component body 1 has internal electrodes 3a to 3c buried in parallel. Further, of the internal electrodes 3a to 3c, the internal electrodes 3a, 3c are electrically connected to one external electrode 2a, whereas the internal electrode 3b is connected to the other external electrode 2b. This ceramic electronic component is supposed to be able to acquire electrostatic capacitance between the internal electrode 3a and the internal electrode 3b, and between the internal electrode 3b and the internal electrode 3c.

It is to be noted that the electrode materials that form the external electrodes 2a, 2b and the internal electrodes 3a to 3c are not to be considered particularly limited as long as the materials have favorable electrical conductivity, but various types of metal materials can be used, such as Pd, Pt, Ag, Ni, and Cu.

For the thus configured variable inductor, the component body 1 is formed from the oxide ceramic composed of the ferromagnetic dielectric body as described above, and the coil 4 is wound so as to surround the external electrode 2a and the external electrode 2b. Thus, when a high-frequency signal is input to the coil 4, a magnetic flux generated in the direction of an arrow A passes through the component body 1, thereby providing inductance depending on the winding number of in the coil, the element shape, and the magnetic permeability of the component body 1. In addition, when a voltage (electric field) is applied to the external electrodes 2a, 2b, an electrical magnetic effect cause a change in magnetization, thereby making it possible to change the inductance L of the coil. Therefore, changing the voltage makes it possible to control the change rate ΔL of the inductance L.

Further, the component body 1 is formed from the above-described oxide ceramic according to the present invention, and thus even at room temperature, a high electrical magnetic coupling coefficient is achieved in a near-zero magnetic field range, without requiring any magnetic bias. In addition, electric polarization can be achieved in a low magnetic field, and a variable inductor can be thus achieved which has a giant electrical magnetic effect.

The variable inductor mentioned above can be manufactured in the following way.

First, ceramic green sheets are prepared in accordance with the same method/procedure as the method for manufacturing the oxide ceramic.

Then, a conductive paste for internal electrodes is prepared which contains a conductive material such as Pd as a main constituent. Then, the conductive paste for internal electrodes is applied to the ceramic green sheets, thereby forming conductive layers in a predetermined pattern on the surfaces of the ceramic green sheets.

Thereafter, the ceramic green sheets with the conductive layers formed and the ceramic green sheets without any conductive film formed are stacked in a predetermined order, and then cut into a predetermined size, thereby providing a ceramic compact.

Next, this ceramic compact is subjected to binder removal treatment at 300 to 500° C. under the air atmosphere, and then subjected to firing treatment at 1150 to 1250° C. under the air atmosphere, thereby providing a ceramic sintered body. Thereafter, heat treatment is carried out in a predetermined oxygen atmosphere, thereby preparing the component body 1.

Then, a conductive paste for external electrodes, containing Ag or the like as a main constituent, is applied to both ends of the component body 1, subjected to baking treatment, and then subjected to polarization treatment.

First, at room temperature, a predetermined magnetic field is applied for magnetic polarization, and then, a predetermined electric field is applied for electric polarization in a direction perpendicular to the direction of the magnetic field, thereby preparing variable inductor. The polarization treatment in the magnetic field as just described can achieve a greater electrical magnetic effect.

It is to be noted that the present invention is not to be considered limited to the embodiment described above. The oxide ceramic according to the present invention can, as described above, achieve a high electrical magnetic coupling coefficient at room temperature and in a near-zero magnetic field range, and induce electric polarization in a low magnetic field to develop a great electrical magnetic effect. Further, even when the polarity of an applied magnetic field is reversed, the polarity of the electric polarization P is not reversed. Therefore, while the variable inductor has been described in the embodiment, the invention is also applicable to various types of ceramic electronic components that require the function effect described above. The invention is applicable to, for example, a magnetic sensor that outputs an electric current depending on the magnitude of a magnetic field, a current sensor that outputs an electric current depending on the magnitude of a magnetic field formed by an electric current flowing through a coil, a non-volatile memory that controls magnetization in an electric field, a variable capacitance device, and the like.

In addition, while electric polarization is produced in a magnetic field in a direction perpendicular to the direction of the magnetic field in the embodiment mentioned above, a great electrical magnetic effect can be achieved even if the direction of the magnetic field is the same direction as the direction of the electric polarization, when the crystal grains are polycrystalline.

In addition, even electric polarization without any magnetic field applied after the magnetic polarization can achieve a great electrical magnetic effect, which can be selected appropriately, depending on the type and environment of usage.

In addition, while the general formula (A) is presented as an example of the present oxide ceramic in the embodiment mentioned above, the oxide ceramic has only to contain at least Sr, Ba, Co, Mg, Fe, and Al within predetermined ranges, and for example, may contain an additive such as $ZrO_2$ for improving the insulation resistance. In addition, the molar ratio of O (oxygen) is also allowed to slightly deviate from the theoretical stoichiometric ratio, to the extent that characteristic are not affected.

Next, an example of the present invention will be specifically described.

EXAMPLE $Fe_2O_3$, $SrCO_3$, $BaCO_3$, $Co_3O_4$, $MgO$, and $Al_2O_3$ were prepared as ceramic raw materials.

Then, the ceramic raw materials were weighed such that oxide ceramics as ceramic sintered bodies were made to have the compositions shown in Table 1.

Next, the thus weighed ceramic raw materials, an aqueous polymer dispersant (KAOCER 2210 from Kao Corporation), and pure water were put along with PSZ balls in a pot mill made of polyethylene, and mixed and ground for 16 hours, thereby providing a mixture.

Next, the mixture was dried, granulated, and then subjected to calcination for 4 hours at a temperature of 1100° C. in the air atmosphere, thereby providing a calcined product.

On the other hand, separately, a polyvinyl butyral-based binder resin (S-LEC B "BM-2" from SEKISUI CHEMICAL CO., LTD.) was dissolved in a mixed solvent of ethanol and toluene, with the addition of a plasticizer thereto, thereby preparing a binder solution.

Then, the calcined product was granulated, then put in a pot mill along with a solvent-based dispersant (KAOCER 8000 from Kao Corporation) and a mixed solvent of ethanol and toluene, as well as PSZ balls, mixed and ground for 24 hours, and then mixed again for 12 hours with the addition of the above-mentioned binder solution thereto, thereby providing ceramic slurry.

Then, the thus prepared ceramic slurry was formed into a sheet of approximately 50 μm in thickness through the use of a doctor blade method, and the sheet was cut into a predetermined size with the use of a mold, thereby providing ceramic green sheets. Then, the ceramic green sheets were stacked to reach a predetermined number of ceramic green sheets, subjected to pressure bonding at a pressure of 196 MPa, and cut, thereby preparing ceramic compacts of sample numbers 1 to 21 with length: 12 mm, width: 12 mm, and thickness: 0.6 mm.

Next, the ceramic compacts of sample numbers 1 to 21 were subjected to binder removal treatment at 500° C. under the air atmosphere, and then subjected to firing treatment for 18 hours at 1200° C. under the air atmosphere, thereby preparing ceramic sintered bodies of sample numbers 1 to 21.

Then, the ceramic sintered bodies of sample numbers 1 to 21 were subjected to heat treatment for 10 hours at a temperature of 1090° C. in an oxygen atmosphere at 1 MPa, thereby preparing respective component bodies of sample numbers 1 to 21.

The dimensions of the component bodies were length: 10 mm, width: 10 mm, and thickness: 0.5 mm.

Next, both principal surfaces of the component bodies were subjected to DC sputtering with Pt as a target substance, thereby preparing surface electrodes of approximately 300 nm in thickness, and thus providing respective samples of sample numbers 1 to 21. It is to be noted that the DC sputtering was carried out by supplying power of 150 W while supplying an Ar gas into a vacuum vessel at a temperature and a magnetic field respectively adjusted to 25° C. and 5 mmT.

Then, the respective samples of sample numbers 1 to 21 were subjected to a composition analysis through the use of an inductively-coupled plasma emission spectrometry (ICP) and an X-ray fluorescence analysis (XRF) method, thereby confirming that the respective samples have the compositions shown in Table 1. In addition, for each sample, the crystal structure was investigated by an X-ray diffraction (XRD) method, thereby confirming that the sample has a hexagonal Y-type crystal structure.

[Evaluation of Sample]

For each sample of sample numbers 1 to 21, the resistivity ρ was measured with the use of a high-resistance measurement meter (6487 from Keithley Instruments in the U.S.), thereby confirming that the samples have sufficient insulation properties achieved, with the resistivity ρ of 50 MΩ·cm or more.

Next, the respective samples of sample numbers 1 to 21 were subjected to polarization treatment.

Figure 3:
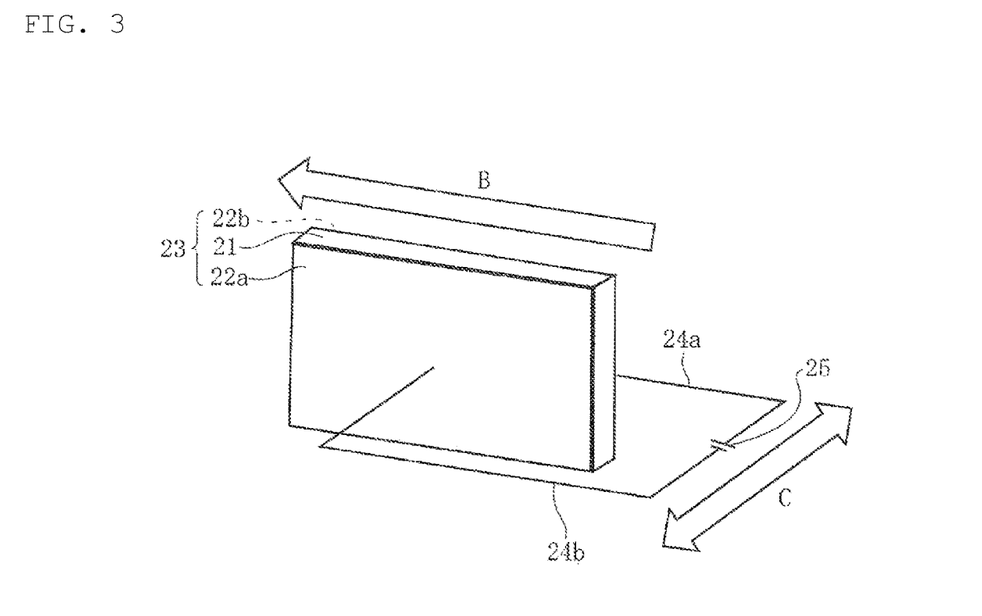
FIG. 3 is a perspective view schematically illustrating a polarization treatment device used in an example.

FIG. 3 is a perspective view schematically illustrating a polarization treatment device.

More specifically, this polarization treatment device has signal lines 24a, 24b connected to a sample 23 with surface electrodes 22a, 22b formed on both principal surfaces of a component body 21, and a direct-current power supply 25 interposed between the signal line 24a and the signal line 24b.

It is to be noted that the sample 23 has internal electrodes as described above, which are arranged such that the direction (indicated by an arrow B) of a magnetic field applied to the sample 23 is perpendicular to the direction (indicated by an arrow C) of an electric field for producing electric polarization.

Then, a direct-current magnetic field of 1.5 T was applied for 1 minute at room temperature with the use of an electric magnet (not shown), thereby producing magnetic polarization in the direction of the arrow B. Then, while applying an electric field of 800 V/mm between the surface electrodes 22a, 22b, the magnitude of the magnetic field was gradually decreased from 1.5 T to 0.5 T, thereby producing electric polarization in the direction of the arrow C for 3 minutes in the magnetic field of 0.5 T. The polarization treatment in the magnetic field as just described makes it possible to achieve a greater electrical magnetic effect.

It is to be noted that in the magnetic polarization described above, the direct-current magnetic field of 1.5 T applied initially corresponds to a magnetic field for a magnetic transition from a special magnetic structure (spiral magnetism) that originates an electrical magnetic effect to a magnetic structure (ferrimagnetism) that exhibits no electrical magnetic effect. The magnetic field for the magnetic transition is shifted to higher magnetic fields under lower temperature environments, and to lower magnetic fields under higher temperature environments. Therefore, it is preferable to apply a higher magnetic field in the case of magnetic polarization at a lower temperature, whereas magnetic polarization is possible even through the application of a lower magnetic field at a higher temperature. In addition, the direct-current magnetic field of 0.5 T means a magnetic field in which the spiral magnetism is stabilized, and there is no need for the direct-current magnetic field to be 0.5 T as long as the spiral magnetism is stabilized at the temperature for magnetic polarization in the magnetic field. While the electric field of 800 V/mm was applied for electric polarization in the example mentioned above, the electric field applied is preferably larger.

It is to be noted that while the samples were disposed for magnetic polarization such that the magnetic field and electric field applied were perpendicular to each other in this example, because the disposition can achieve the greatest electrical magnetic effect in the case of the shapes of the samples prepared in the present example, an electrical magnetic effect can be achieved even in any disposition other than the disposition for making the magnetic field and the electric field perpendicular to each other.

Next, the evaluation samples were left for approximately 1 hour without applying the electric field and the magnetic field.

As just described, leaving the sample for a predetermined period of time after carrying out the polarization treatment makes it possible to achieve a further great electrical magnetic effect.

Next, the electrical magnetic current was measured for each sample, thereby making characteristic evaluations.

Figure 4:
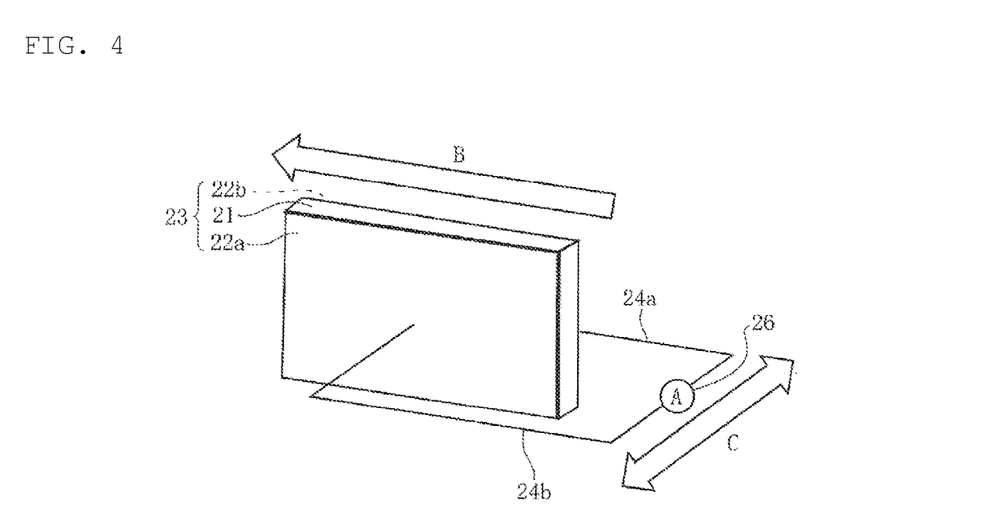
FIG. 4 is a perspective view schematically illustrating an electrical magnetic current measurement device used in the example.

FIG. 4 is a perspective view schematically illustrating a characterization device for the sample 23.

This characterization device is provided with a pico ammeter (6487 from Keithley Instruments in the U.S.) 26, in place of the direct-current power supply 25 in FIG. 3, and the evaluation sample is disposed such that the direction of a magnetic field applied is perpendicular to the direction of an electric field for electric polarization, as in FIG. 3.

Then, while controlling the temperature to 25° C. (298 K) with a low-temperature cryostat (Type LN-Z from Toyo Corporation), reciprocating sweep was carried out multiple times at a rate of approximately 0.13 T/min in a magnetic field range of −0.21 T to +0.21 T with the use of an electric magnet, and the charge discharged from the sample in this case, that is, the electrical magnetic current was measured with the pico ammeter 26.

Then, the current density J of the measured electrical magnetic current was integrated with respect to time, thereby figuring out electric polarization P to serve as an indicator of ferroelectric. In addition, for each sample with the electric polarization P achieved, whether or not the polarity of the electric polarization P was reversed was checked when the polarity of the applied magnetic field was reversed.

Table 1 shows the composition, electric polarization P, and polarity reversion, for each sample of sample numbers 1 to 21.

It is to be noted that as for the polarity reversion, a case where the polarity of the electric polarization P was not reversed even when the polarity of the applied magnetic field was reversed is referred to as a mark ○, whereas a case where the polarity of the electric polarization P was also reversed when the polarity of the applied magnetic field was reversed is referred to as a mark x.

TABLE 1

| Sample No. | $Sr_{2-x}Ba_xCo_{2-y}Mg_yFe_{12-z}Al_zO_{22}$ | | | Electric Polarization P ($\mu C/m^2$) | Polarity Reversion |
|---|---|---|---|---|---|
| | x | y | z | | |
| 1* | 1.0 | 1.0 | 1.0 | — | — |
| 2* | 1.0 | 0.9 | 1.0 | — | — |
| 3 | 1.0 | 0.8 | 1.0 | 13.3 | ○ |
| 4 | 1.0 | 0.4 | 1.0 | 12.2 | ○ |
| 5* | 1.0 | 0.0 | 1.0 | 17.5 | x |
| 6 | 1.3 | 0.4 | 1.0 | 10.8 | — |
| 7* | 1.4 | 0.4 | 1.0 | — | — |
| 8 | 0.7 | 0.4 | 1.0 | 11.3 | ○ |
| 9* | 0.6 | 0.4 | 1.0 | — | — |
| 10* | 1.0 | 0.4 | 0.7 | — | — |
| 11* | 1.0 | 0.0 | 0.7 | — | — |
| 12 | 1.0 | 0.8 | 0.8 | 11.3 | ○ |
| 13* | 1.0 | 0.0 | 0.8 | 15.1 | x |
| 14 | 1.0 | 0.8 | 1.2 | 6.9 | ○ |
| 15* | 1.0 | 0.0 | 1.2 | 16.0 | x |
| 16* | 1.0 | 0.0 | 1.3 | — | — |
| 17* | 1.0 | 0.0 | 1.3 | — | — |
| 18 | 1.3 | 0.8 | 0.8 | 9.7 | ○ |
| 19 | 0.7 | 0.8 | 0.8 | 6.9 | ○ |
| 20 | 1.3 | 0.8 | 1.2 | 6.0 | ○ |
| 21 | 0.7 | 0.8 | 1.2 | 6.2 | ○ |

*outside of the scope of the present invention

Sample number 1 failed to exhibit any electrical magnetic effect, because the content of Mg was excessively high with y of 1.0.

Sample number 2 was, also in this case, high in Mg content with y of 0.9, and for this reason, any electrical magnetic current was not able to be measured, thereby failing to achieve the electric polarization P.

Sample number 7 was relatively low in molar ratio of Sr to Ba with x of 1.4, and for this reason, any electrical magnetic current was not able to be measured at room temperature, thereby failing to achieve the electric polarization P.

Sample number 9 was relatively high in molar ratio of Sr to Ba with x of 0.6, and also in this case, any electrical magnetic current was not able to be measured at room temperature, thereby failing to achieve the electric polarization P.

Sample numbers 10 and 11 with low z of 0.7 failed to induce any spiral magnetic structure for producing the electric polarization P at room temperature, thereby failing to measure any electrical magnetic current.

Sample numbers 16 and 17 with high z of 1.3 produced different phases, and the production of the different phases interfered with the development of electrical magnetic characteristics, thereby failing to measure any electrical magnetic current at room temperature, and thus failing to achieve the electric polarization P.

Sample numbers 5, 13, and 15 were favorably 15.1 to 17.5 $\mu C/m^2$ in electric polarization P, but because of the samples containing therein no Mg with y of 0.0, the polarity of the electric polarization P was also reversed when the polarity of the applied magnetic field was reversed.

In contrast, sample numbers 3, 4, 6, 8, 12, 14, and 18 to 21 have x of 0.7 to 1.3, y of 0.8 or less, and z of 0.8 to 1.2, all within the scope of the present invention. Thus, it has been determined that ferromagnetic dielectric bodies are achieved which have favorable electric polarization P of 6.0 $\mu CE/m^2$ or more at room temperature of 298 K, and furthermore produce a desired electrical magnetic effect that: the polarity of the electric polarization P is not reversed even when the polarity of the applied magnetic field is reversed.

Figure 5:
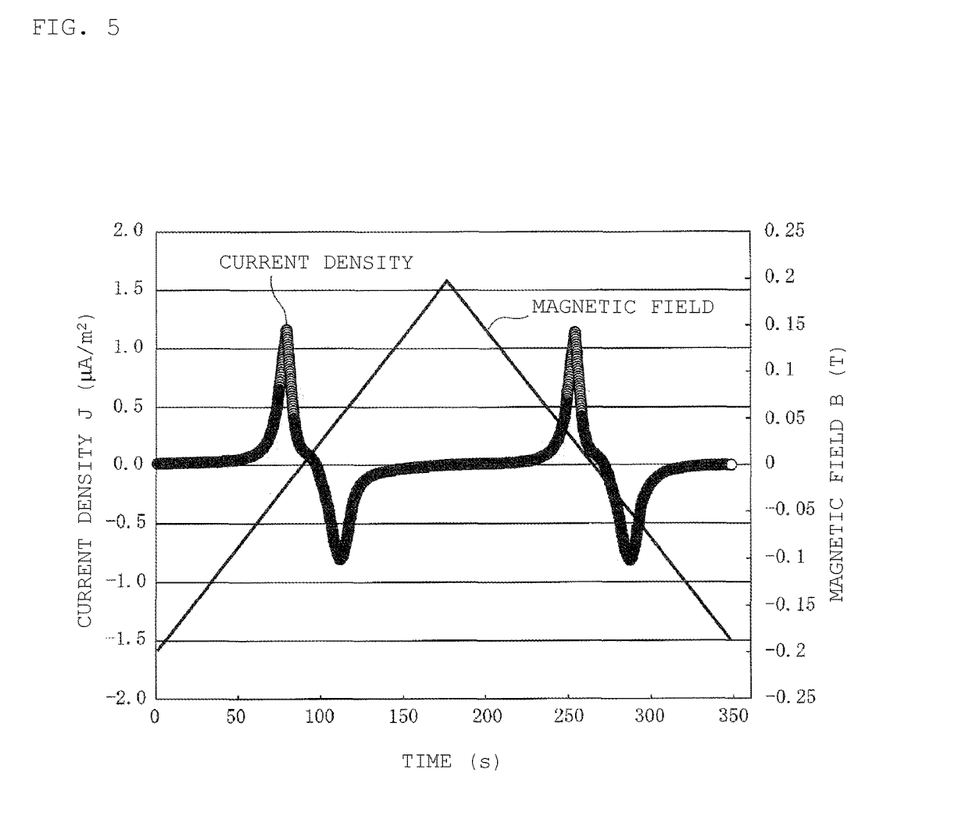
FIG. 5 is a diagram showing temporal changes in current density and magnetic field for sample number 3.

FIG. 5 is a diagram showing temporal changes of the magnetic field and the current density J for sample number 3, where the horizontal axis indicates time (s), the right vertical axis indicates the magnetic field B (T), and the left vertical axis indicates the current density J ($\mu A/m^2$).

As shown in FIG. 5, when the magnetic field is subjected to reciprocating sweep multiple times at a constant rate in the range of approximately −0.2 T to +0.2 T, an electrical magnetic current flows from the sample near the zero magnetic field, thereby providing the current density J. More specifically, the electrical magnetic current is observed in the zero magnetic field without attenuation even in the continuous sweep of approximately −0.2 T to +0.2 T to −0.2 T.

As just described, it has been determined that the electric polarization P is induced in a weak magnetic field, and extinguished or reduced in the zero magnetic field, thereby producing an electrical magnetic effect at room temperature.

Further, when the current density J of the electrical magnetic current is integrated, the electric polarization P is obtained, thereby providing electric polarization characteristics.

Figure 6:
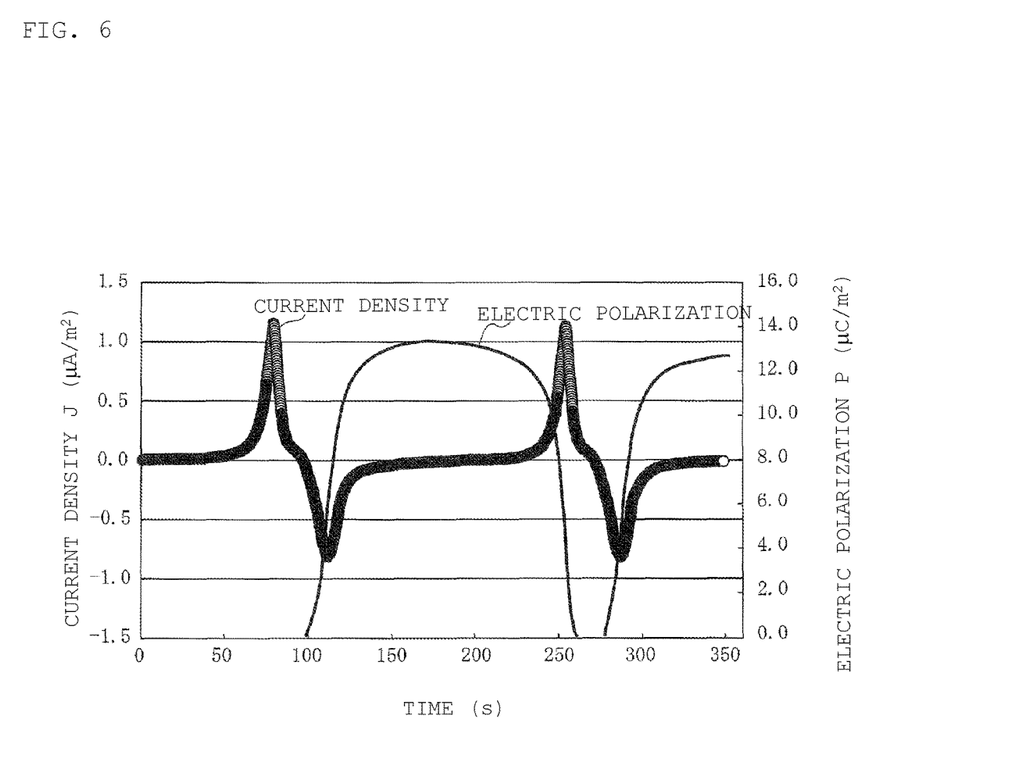
FIG. 6 is a diagram showing temporal changes in current density and electric polarization for sample number 3.

FIG. 6 is a diagram showing temporal changes of the electric polarization P and the current density J for sample number 3, where the horizontal axis indicates time (s), the right vertical axis indicates the electric polarization P ($\mu C/m^2$), and the left vertical axis indicates the current density J ($\mu A/m^2$).

As is clear from FIG. 6, the electric polarization P is 13.3 $\mu C/m^2$ at room temperature of 298 K and a low magnetic field, and it has been thus determined that the electric polarization P is achieved which is comparable to or more than that of the hexagonal Z-type crystal structure as in Patent Document 3.

In addition, from FIGS. 5 and 6, it has been confirmed that even when the polarity of the magnetic field B is reversed from negative to positive or from positive to negative, the ferromagnetic polarization is induced in the same direction without reversing the electric polarization P.

Next, the electrical magnetic coupling coefficient α was figured out on the basis of the formula (7).

$$\alpha = (\mu_0 \cdot J)/(dB/dt) \quad (7)$$

where the magnetic permeability $\mu_0$ in vacuum is $4\pi \times 10^{-7}$ H/m.

Figure 7:
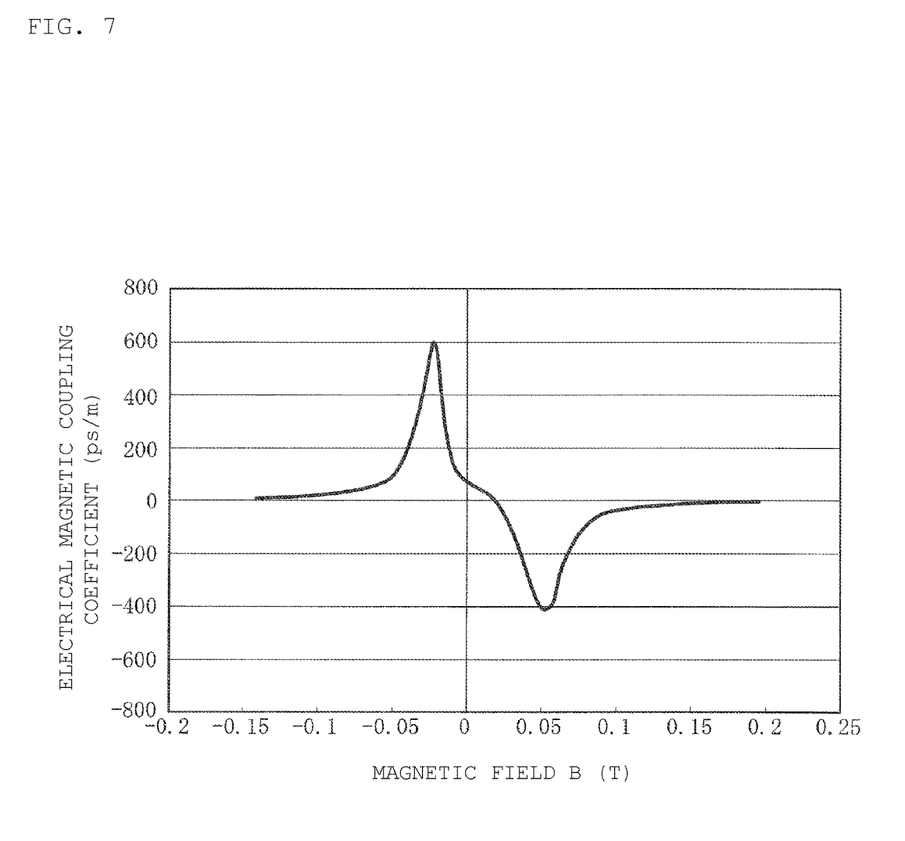
FIG. 7 is a diagram showing the relationship between the magnetic field and electrical magnetic coupling coefficient for sample number 3.

FIG. 7 is a diagram showing the relationship between the magnetic field and the electrical magnetic coupling coefficient α for sample number 3, where horizontal axis indicates a magnetic field (T), whereas the vertical axis indicates the electrical magnetic coupling coefficient α (ps/m).

As is clear from FIG. 7 herein, the electrical magnetic coupling coefficient α of approximately 600 ps/m at approximately −0.025 T under room temperature of 298 K has succeeded in obtaining a ferromagnetic dielectric material with a high electrical magnetic coupling coefficient α.

As just described, it has been determined that the oxide ceramic according to the present invention achieves ferromagnetic dielectric materials that can achieve large electric polarization P of 6.0 to 13.3 $\mu C/m^2$ in a low magnetic field even at room temperature, and further achieve high electrical magnetic coupling coefficients α of approximately 600 ps/m in a near-zero magnetic field range, and produce a desired electrical magnetic effect that the polarity of the electric polarization P is not reversed when the polarity of an applied magnetic field is reversed.

Oxide ceramics can be obtained which can achieve dramatically higher electrical magnetic coupling coefficients than ever before in a near-zero magnetic field range even at room temperature, and develop ferromagnetic dielectric characteristics with favorable electric polarization P in a low magnetic field, where the polarity of the electric polarization P is not reversed even when the polarity of an applied magnetic field is reversed. The use of the oxide ceramic makes it possible to achieve various types of ceramic electronic components such as variable inductors, magnetic sensors, and non-volatile memories.

DESCRIPTION OF REFERENCE SYMBOLS

1: component body
2a, 2b: external electrode
3a to 3c: internal electrode

The invention claimed is:

1. An oxide ceramic comprising:
a ferrite compound containing at least Sr, Ba, Co, and Fe, wherein some of the Sr is substituted by the Ba, and when a content of the Ba is represented by x/2 in terms of molar ratio with respect to a total amount of the Ba and the Sr, $0.7 \leq x \leq 1.3$,
some of the Co is substituted by Mg, and when a content of the Mg is represented by y/2 in terms of molar ratio with respect to a total amount of the Mg and the Co, $0 < y \leq 0.8$, and
some of the Fe is substituted by Al, and when a content of the Al is represented by z/12 in terms of molar ratio with respect to a total amount of the Al and the Fe, $0.8 \leq z \leq 1.2$, and
wherein the ferrite compound is $Sr_{2-x}Ba_xCo_{2-y}Mg_yFe_{12-z}Al_zO_{22}$.

2. The oxide ceramic according to claim 1, wherein $0.4 \leq y \leq 0.8$.

3. The oxide ceramic according to claim 1, wherein the ferrite compound has a hexagonal Y-type crystal structure.

4. The oxide ceramic according to claim 2, wherein a polarity of electric polarization is not reversed when a polarity of a magnetic field applied to the ferrite compound is reversed.

5. A ceramic electronic component comprising a component body comprising the oxide ceramic according to claim 1.

6. The ceramic electronic component according to claim 5, further comprising an external electrode on a surface of the component body.

7. The ceramic electronic component according to claim 6, further comprising a coil wound around the component body and the external electrode and positioned relative thereto so as to have inductance based on a magnetic permeability of the component body.

8. The ceramic electronic component according to claim 7, further comprising an internal electrode buried in the component body and electrically connected to the external electrode.

9. The ceramic electronic component according to claim 5, further comprising a coil wound around the component body and positioned relative thereto so as to have inductance based on a magnetic permeability of the component body.

10. The ceramic electronic component according to claim 9, further comprising an internal electrode buried in the component body.

11. The ceramic electronic component according to claim 5, further comprising a pair of external electrodes on opposed surfaces of the component body.

12. The ceramic electronic component according to claim 11, further comprising a coil wound around the component body and the pair of external electrodes and positioned relative thereto so as to have inductance based on a magnetic permeability of the component body.

13. The ceramic electronic component according to claim 11, further comprising:
a first internal electrode buried in the component body and electrically connected to a first external electrode of the pair of external electrodes; and
a second internal electrode buried in the component body and electrically connected to a second external electrode of the pair of external electrodes.

14. The ceramic electronic component according to claim 13, wherein the first internal electrode is parallel to the second internal electrode.

15. The ceramic electronic component according to claim 5, wherein $0.4 \leq y \leq 0.8$.

16. The ceramic electronic component according to claim 15, wherein a polarity of electric polarization is not reversed when a polarity of a magnetic field applied to the component body is reversed.

* * * * *